US010435798B2

(12) United States Patent
Kurokawa et al.

(10) Patent No.: US 10,435,798 B2
(45) Date of Patent: Oct. 8, 2019

(54) HYDROGEN GAS GENERATOR (71) Applicant: MiZ Company Limited, Kanagawa (JP)

(72) Inventors: Ryousuke Kurokawa, Kanagawa (JP); Kenji Tanaka, Nagano (JP); Fumitake Satoh, Kanagawa (JP); Bunpei Satoh, Kanagawa (JP)

(73) Assignee: MIZ Company Limited, Kanagawa (JP)

( * ) Notice: Subject to any disclaimer, the term of this patent is extended or adjusted under 35 U.S.C. 154(b) by 397 days.

(21) Appl. No.: 15/134,789

(22) Filed: Apr. 21, 2016

(65) Prior Publication Data
US 2017/0044677 A1    Feb. 16, 2017

(30) Foreign Application Priority Data

Aug. 11, 2015   (JP) .................. 2015-158735
Mar. 31, 2016   (JP) .................. 2016-072956

(51) Int. Cl.
C25B 15/02        (2006.01)
C25B 1/10         (2006.01)
(Continued)

(52) U.S. Cl.
CPC .............. *C25B 1/06* (2013.01); *C25B 1/10* (2013.01); *C25B 9/08* (2013.01); *C25B 15/02* (2013.01); *Y02E 60/366* (2013.01)

(58) Field of Classification Search
CPC ................................... C25B 15/02
See application file for complete search history.

(56) References Cited

U.S. PATENT DOCUMENTS 6,375,812 B1 *   4/2002   Leonida .................. C25B 1/04
                                                    204/269
2002/0108865 A1   8/2002   Bryan et al.
(Continued)

FOREIGN PATENT DOCUMENTS

CN    101705497 A    5/2010
CN    203602721 U    5/2014
(Continued)

OTHER PUBLICATIONS

Machine translation of JP 2009-005881. (Year: 2009).*
(Continued)

*Primary Examiner* — Brian W Cohen
(74) *Attorney, Agent, or Firm* — Muncy, Geissler, Olds & Lowe, P.C (57) ABSTRACT A hydrogen gas generator comprises: an electrolyzer (2) configured to include a housing (20), a first chamber (21), a second chamber (22), a membrane (25), and a pair of electrode plates (23, 24); a tank (6) configured to store water to be electrolyzed (W); an electric power source (3) configured to apply a DC voltage to the pair of electrode plates; a diluter (4) configured to introduce a diluent gas into the first chamber or the second chamber in which the electrode plate to be a cathode is provided, the diluent gas diluting hydrogen gas generated; an electric quantity detector (51) configured to detect an electric quantity given to the electrode plate to be the cathode; a flow rate detector (52) configured to detect a flow rate of the diluent gas from the diluter; a calculator (5) configured to calculate a concentration of the diluted hydrogen gas on the basis of the electric quantity detected by the electric quantity detector and the flow rate detected by the flow rate detector; and an indicator (54) configured to present the concentration of hydrogen gas calculated by the calculator.

16 Claims, 8 Drawing Sheets (51) Int. Cl.
*C25B 1/06* (2006.01)
*C25B 9/08* (2006.01)

(56) References Cited

U.S. PATENT DOCUMENTS

| | | | |
|---|---|---|---|
| 2002/0185126 A1 | 12/2002 | Krebs | |
| 2010/0175941 A1* | 7/2010 | Khodabakhsh | F02M 25/12 180/69.5 |
| 2014/0378745 A1* | 12/2014 | Lin | C25B 15/08 600/27 |
| 2015/0144132 A1* | 5/2015 | Satoh | A61M 16/0057 128/202.26 |
| 2016/0348265 A1* | 12/2016 | Mayer | C25D 21/18 |

FOREIGN PATENT DOCUMENTS

| | | |
|---|---|---|
| CN | 104379812 A | 2/2015 |
| DE | 19645693 C1 | 5/1998 |
| EP | 0537526 A1 | 4/1993 |
| EP | 0973443 B1 | 3/2006 |
| EP | 2927349 A1 | 10/2015 |
| JP | 2005214933 A | 8/2005 |
| JP | 2005256028 A | 9/2005 |
| JP | 2009-005881 A | 1/2009 |
| WO | WO-2013183448 A1 * 12/2013 ........ A61M 16/0057 |

OTHER PUBLICATIONS

State Intellectual Property Office of People's Republic of China, First Office Action with search results, dated Nov. 14, 2017, in CN Application No. 201610363806.6.

German Patent and Trademark Office, Office Action with search results, dated Dec. 14, 2017, in DE Application No. 102016109569.9.

* cited by examiner

FIG.8 ent of the present invention;

HYDROGEN GAS GENERATOR

BACKGROUND OF THE INVENTION

1. Technical Field of the Invention

The present invention relates to a hydrogen gas generator.

2. Description of the Related Art

An inhalation apparatus for hydrogen gas is known, which is configured such that an air mixer is attached to a part of a conduit pipe from a hydrogen gas generator to a nasal cavity cannula thereby to adjust the concentration of hydrogen gas to be supplied into the body (Patent Document 1: JP 2009-5881 A). In this inhalation apparatus for hydrogen gas, a sensor for detecting the hydrogen gas concentration is provided in the gas flow channel between the air mixer and the nasal cavity cannula, and the hydrogen gas concentration detected by the sensor is fed back to a controller for controlling the value of an electrolytic current to be applied to the hydrogen gas generator.

Patent Document 1: JP 2009-5881 A

When this kind of hydrogen gas generator is used for a patient to inhale hydrogen gas, it may be preferred that the generator can display the hydrogen gas concentration to allow the patient or an operator to confirm whether the hydrogen gas concentration has an appropriate value.

Examples of a commonly-known sensor for detecting the hydrogen gas concentration include a sensor device using a hydrogen absorbing alloy or the like of which the electric resistance value reversibly varies due to selective absorption of hydrogen gas (JP 2005-256028 A) and a sensor device using a thin film layer of which the resistance value reversibly varies due to contact with a sample gas that is oxidized and decomposed through a photocatalyst layer utilizing a photocatalytic action (JP 2005-214933 A). However, if such kind of sensor device is used as the sensor for detecting the hydrogen gas concentration in the above apparatus of the prior art, the lifetime of the sensor device will be shortened due to the moisture contained in the hydrogen gas, which may be problematic.

Therefore, an object of the present invention is to provide a hydrogen gas generator that can accurately present the concentration of generated hydrogen gas without using a hydrogen gas concentration sensor which is weak against moisture.

SUMMARY OF THE INVENTION

In an aspect of the present invention, the above object can be achieved by providing an apparatus for generating hydrogen gas using an electrolyzer, in which the hydrogen gas concentration is calculated on the basis of an electric quantity given to the cathode and a flow rate of the hydrogen gas and/or diluent gas for diluting the hydrogen gas.

In an embodiment, the electrolyzer may be configured to include: a housing; a first chamber formed in the housing and into which water to be electrolyzed is introduced; a second chamber provided separately from the first chamber in the housing; a membrane provided between the first chamber and the second chamber in the housing; and a pair of electrode plates one of which is provided in the first chamber and the other of which is provided in the second chamber.

In an embodiment, the apparatus may include: a tank configured to store the water to be electrolyzed; an electric power source configured to apply a DC voltage to the pair of electrode plates; a diluter configured to introduce a diluent gas for diluting the generated hydrogen gas into the first chamber or the second chamber in which the electrode plate to be the cathode is provided; an electric quantity detector configured to detect an electric quantity given to the electrode plate to be the cathode; a flow rate detector configured to detect a flow rate of the diluent gas from the diluter; a calculator configured to calculate a concentration of the diluted hydrogen gas on the basis of the electric quantity detected by the electric quantity detector and the flow rate detected by the flow rate detector; and an indicator configured to present the concentration of hydrogen gas calculated by the calculator.

In an embodiment, the apparatus may further include a temperature detector configured to detect a temperature of the diluted hydrogen gas, and the concentration of the diluted hydrogen gas may be calculated further on the basis of the temperature detected by the temperature detector.

In another aspect of the present invention, the apparatus may include a first flow rate detector configured to detect a flow rate of a gas containing hydrogen and a second flow rate detector configured to detect a flow rate of a diluent gas for diluting the gas containing hydrogen, and the concentration of hydrogen gas diluted with the diluent gas may be calculated on the basis of the flow rate detected by the first flow rate detector and the flow rate detected by the second flow rate detector.

According to the present invention, the concentration of the generated hydrogen gas can be accurately presented without using a hydrogen gas concentration sensor which is weak against moisture.

DESCRIPTION OF THE PREFERRED EMBODIMENT

Various embodiments of a hydrogen gas generator 1 according to the present invention will be described hereinafter. The hydrogen gas generator 1 can be used to generate hydrogen gas and supply the generated hydrogen gas to living organisms, for example, for the purpose of health maintenance, functional maintenance, disease improvement, functional improvement, health check, and/or functional measurement for living organisms (humans and animals) including cells and organs. Examples of supply means for the generated hydrogen gas to living organisms include: supply by way of inhaling the hydrogen gas from the nasal cavity and/or mouth cavity; supply by way of exposing the skin or organ to the hydrogen gas; supply by way of blowing the hydrogen gas to the skin or organ; supply by way of exposing to the hydrogen gas a living organism applicable liquid, such as liquid drug and organ storage liquid, which may be applied to a living organism; supply by way of blowing the hydrogen gas into a living organism applicable liquid; and supply by way of diffusing the hydrogen gas from the outside of a container which stores a living organism or from the outside of a circuit which is provided with a living organism. Note, however, that the intended use of the generated hydrogen gas is not limited because the present invention is aimed at providing a hydrogen gas generator that can accurately present the concentration of the generated hydrogen gas without using a hydrogen gas concentration sensor which is weak against moisture, as described above.

Figure 1:
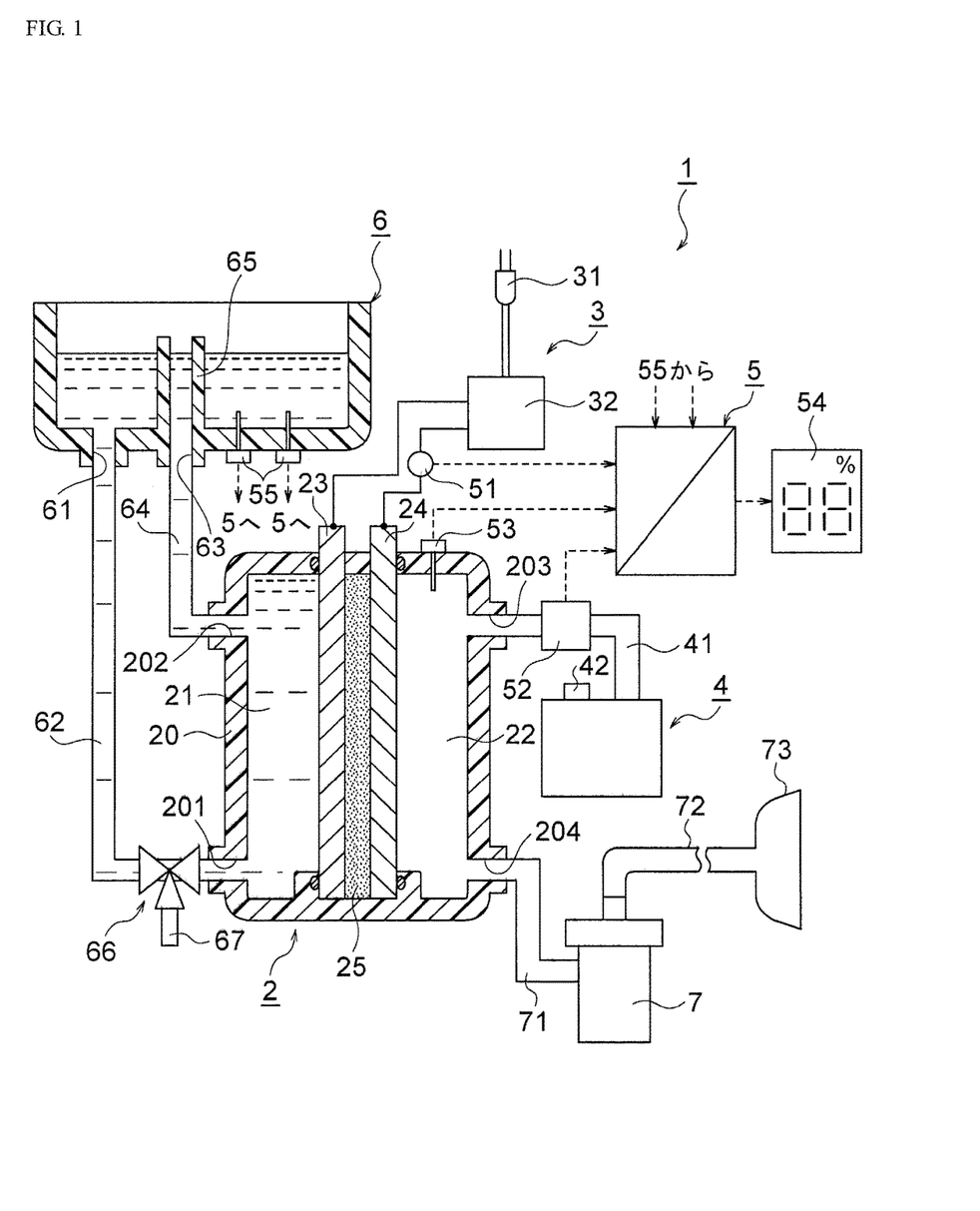
FIG. 1 is a schematic view illustrating the overall structure of a hydrogen gas generator according to an embodiment of the present invention.

FIG. 1 is a schematic view illustrating the overall structure of a hydrogen gas generator 1 according to an embodiment of the present invention. The hydrogen gas generator 1 of the present embodiment comprises: an electrolyzer 2; a tank 6 that stores water to be electrolyzed W; an electric power source 3 that applies a DC voltage to a pair of electrode plates 23 and 24 provided in the electrolyzer 2; a diluter 4 that introduces a diluent gas for diluting the generated hydrogen gas into the electrolyzer 2; an electric quantity detector 51 that detects an electric quantity given to the electrode plate 23 or 24 to be the cathode; a flow rate detector 52 that detects a flow rate of the diluent gas from the diluter 4; a temperature detector 53 that detects a temperature of the diluted hydrogen gas; a calculator 5 that calculates a concentration c of the diluted hydrogen gas; an indicator 54 that presents the concentration c of hydrogen gas calculated by the calculator 5; and a resistance detector 55 that detects an electric resistance value of the water to be electrolyzed W stored in the tank 6.

The electrolyzer 2 is configured to include: a housing 20; a first chamber 21 formed in the housing 20 and into which the water to be electrolyzed W is introduced; a second chamber 22 provided separately from the first chamber 21 in the housing 20; a membrane 25 provided between the first chamber 21 and the second chamber 22 in the housing 20; and a pair of electrode plates 23 and 24 provided in the first chamber 21 and the second chamber 22, respectively. The housing 20 may be formed of an electrically insulating material, such as plastic, and configured such that the sealing state for water and gas can be maintained except for an inlet 201 for the water to be electrolyzed W, a gas outlet 202, a diluent gas inlet 203, and a mixed gas outlet 204, which will be described later.

The inside of the housing 20 is partitioned by the membrane 25 into the first chamber 21 and the second chamber 22. In the present embodiment, each of the pair of electrode plates 23 and 24 is provided to be in contact with the membrane 25. The electrode plate 23 provided in the first chamber 21 into which the water to be electrolyzed W is introduced is connected to the positive terminal (+) of a DC electric power source, and the electrode plate 24 provided in the second chamber 22 is connected to the negative terminal (−) of the DC electric power source. In the following description, the electrode plate connected to the positive terminal may be referred to as an anode plate, and the electrode plate connected to the negative terminal may be referred to as a cathode plate. Accordingly, the embodiment illustrated in FIG. 1 refers to an anode plate 23 provided in the first chamber 21 and a cathode plate 24 provided in the second chamber 22.

The membrane 25 used in the present embodiment may preferably be a cation exchange membrane which is permeable to hydrogen ions but impermeable to hydroxy ions. In consideration of necessary factors, such as the ion conductivity, physical strength, gas barrier property, chemical stability, electrochemical stability and the thermal stability, there may preferably be used an all fluorine-based sulfonic acid membrane that comprises sulfonic groups as the electrolyte groups. Examples of such a membrane include a membrane of Nafion (registered trademark, a DuPont product) which is a copolymer membrane of tetrafluoroethylene and perfluorovinyl ether having a sulfonic group, a membrane of Flemion (registered trademark, available from ASAHI GLASS CO., LTD.), and a membrane of Aciplex (registered trademark, available from Asahi Kasei Corporation).

The pair of electrode plates 23 and 24 used in the present embodiment may be those using titanium plates as base materials which are each plated with one or more layers of noble metal selected from the group of platinum, iridium, palladium and the like. However, the present invention is not limited to using such electrode plates, and solid stainless steel plates may also be used without plating. The anode plate 23 in the first chamber 21 may not necessarily be provided to be in contact with the membrane 25, and may also be provided to have a certain distance from the membrane 25. In the present embodiment, the cathode plate 24 in the second chamber 22 is provided to be in contact with the membrane 25, but may not necessarily be pressed and fixed to the membrane 25 because it may be enough if the cathode plate 24 is in contact with the membrane 25 to such an extent that a water film is formed therebetween.

The electric power source 3 is configured to include: a plug 31 that is connected to a commercial AC power source; and an AC/DC converter 32 that converts the commercial AC current to a DC current. Alternatively or additionally, a DC power source such as a primary or secondary battery may be used as substitute for or in addition to the plug 31 and the AC/DC converter 32 in order to provide a portable hydrogen gas generator 1 (i.e. a hydrogen gas generator 1 that can be carried anywhere). In the hydrogen gas generator 1 of the present embodiment, an ammeter as the electric quantity detector 51 is provided for a cable that connects between the AC/DC converter 32 and the cathode plate 24.

The tank 6 in which the water to be electrolyzed W is put is located above the electrolyzer 2 in the vertical direction and has a bottom surface provided with an outlet 61 for the water to be electrolyzed W. The outlet 61 for the water to be electrolyzed W is connected via a hose 62 to the inlet 201 for the water to be electrolyzed W which is provided at the lower part of the first chamber 21. The gas outlet 202, which is provided at the upper part of the first chamber 21, is connected via a hose 64 to a gas inlet 63 provided at the tank 6. The gas inlet 63 communicates with a gas exhaust tower 65 that is raised in the tank 6 to extend from the bottom surface of the tank 6 in the vertical direction. The top end of the gas exhaust tower 65 is opened. A three-way valve 66 is provided in the middle of the hose 62 connecting between the outlet 61 and inlet 201 for the water to be electrolyzed W, and one port of the three-way valve 66 is connected with a drainpipe 67. The drainpipe 67 is provided to discharge the water to be electrolyzed W introduced in the first chamber 21. As will be understood, it may not be necessary to connect the gas outlet 202 provided at the upper part of the first chamber 21 and the gas inlet 63 provided at the tank 6 via the hose 64. In an alternative embodiment, the volume of the water to be electrolyzed W which can be put in the tank 6 may be made smaller than the volume of the first chamber 21, and the gas outlet 202 of the first chamber 21 may be formed at the ceiling surface of the first chamber 21.

In the electrolyzer 2 of the hydrogen gas generator 1 of the present embodiment, the water to be electrolyzed W is introduced only into the first chamber 21 and is not introduced into the second chamber 22, which is therefore an air chamber. When the water to be electrolyzed W is introduced into the first chamber 21, the water to be electrolyzed W is put in the tank 6 in a state in which the three-way valve 66 is rotated to a position that allows the outlet 61 for the water to be electrolyzed W to communicate with the inlet 201 for the water to be electrolyzed W. Through this operation, the water to be electrolyzed W put in the tank 6 reaches the first chamber 21 due to its own weight via the hose 62 to fill the first chamber 21. In this operation, the air in the first chamber 21 passes through the hose 64 and is exhausted from the gas exhaust tower 65, so that the water to be electrolyzed W in the tank 6 can smoothly fill the first chamber 21 in a short time. Moreover, even if the amount of the water to be electrolyzed W introduced into the first chamber 21 from the tank 6 is not less than the volume of the first chamber 21, the water to be electrolyzed W does not leak in the housing 20, and the overflowed water to be electrolyzed W can be returned to the tank 6. When a DC current flows between the pair of electrode plates 23 and 24 after the first chamber 21 is filled with the water to be electrolyzed W, oxygen gas is generated from the surface of the anode plate 23 in the first chamber 21, but the oxygen gas passes through the hose 64 and is exhausted from the gas exhaust tower 65. Accordingly, the first chamber 21 can be filled with the water to be electrolyzed W even during the electrolysis, and therefore the effective surface area of the anode plate 23 does not decrease. This results in an effect of increasing the production efficiency of hydrogen gas.

The water to be electrolyzed W used in the hydrogen gas generator 1 of the present embodiment is water from which hydrogen gas can be generated at the cathode plate 24 owing to an electrolysis reaction of the water. Examples of the water to be electrolyzed W include tap water, clean water, purified water, ion-exchanged water, RO water, and distilled water. The water to be electrolyzed W may appropriately contain electrolytes such as calcium ions and magnesium ions. However, in order to avoid generation of unnecessary gas other than hydrogen gas and oxygen gas during the electrolysis, it may be preferred to prepare the water to be electrolyzed W by artificially adding a water-soluble compound to pure water, such as ion-exchanged water and purified water, which does not contain ions other than hydrogen ions and hydroxy ions. In particular, it is basically said that chlorine gas is not beneficial for a living organism. Therefore, some removal treatment for chlorine gas may preferably be performed for the water to be electrolyzed W to be used in the hydrogen gas generator 1 of the present embodiment. For the same reason, a reduced concentration of chlorine gas may be preferred in a mixed gas that contains the hydrogen gas and the diluent gas. The chlorine gas concentration in the mixed gas of the hydrogen gas and diluent gas may preferably be 1 ppm or less, more preferably 0.5 ppm or less, and further preferably 0.1 ppm or less. Furthermore, when electrolysis is performed for water containing a water-soluble compound that releases anions when dissolved in water, such as $PO_4^{3-}$, $SO_4^{2-}$ and $NO_3^-$, which have higher ionization tendency than that of hydroxide ions (it is preferred that the water itself is preliminarily subjected to removal treatment for ions), the reaction of the hydroxide ions generating oxygen ($O_2$) while releasing electrons takes place preferentially to gasification of the anions. Therefore, unnecessary gas is less likely to be released into the gas layer portion.

To detect the type and content as the above of the water to be electrolyzed W and the water level of the water to be electrolyzed W, the bottom part of the tank 6 is provided with a resistance detector 55, which detects the electric resistance value of the water to be electrolyzed W stored in the tank 6. The resistance detector 55 may comprise, for example, a pair of electrodes plated with platinum. The resistance detector 55 is applied with a voltage for detection from the calculator 5, which then detects the current flowing between that pair of electrodes thereby to detect the electric resistance value of the water to be electrolyzed W. In general, the electric resistance value of pure water that does not contain ions other than hydrogen ions and hydroxy ions ($\approx 2.5\times10^5$ Ωm) is larger than the electric resistance value of water that contains other electrolytic ions in addition to hydrogen ions and hydroxy ions. Therefore, if the electric resistance value of the water to be electrolyzed W as detected by the resistance detector 55 is smaller than the electric resistance value of pure water, the calculator 5 can determine that the water put in the tank 6 is not pure water. Upon this determination, the calculator 5 may prohibit applying the DC voltage from the electric power source 3 to the pair of electrode plates 23 and 24 or display that the water to be electrolyzed W is not pure water. This display may be substituted with notification by voice or sound. Similarly, if the amount of water put in the tank 6 is not enough to fill the first chamber 21, or if the medium detected by the resistance detector 55 is air, such as when water is not put in the tank 6, the detected electric resistance value ($\approx 10^{15}$ Ωm order) will be further larger than the electric resistance value of pure water. Therefore, if the electric resistance value of the water to be electrolyzed W as detected by the resistance detector 55 is significantly larger than the electric resistance value of pure water, the calculator 5 can determine that water is not put in the tank 6. Upon this determination, the calculator 5 may prohibit applying the DC voltage from the electric power source 3 to the pair of electrode plates 23 and 24 or display that the water to be electrolyzed W is not put in the tank 6. This display may be substituted with notification by voice or sound.

The diluent gas inlet 203 is formed at the upper part of the second chamber 22 of the electrolyzer 2, and the mixed gas outlet 204 is formed at the lower part of the second chamber 22. The diluent gas inlet 203 is connected to the diluter 4 via a hose 41, and the flow rate detector 52 is provided in the middle of the hose 41. The diluter 4 comprises an air pump that introduces air into the first chamber 21 or second chamber 22 in which the electrode plate 23 or 24 to be the cathode is provided (the second chamber 22 in the embodiment illustrated in FIG. 1). The ambient air inlet from an intake 42 of the diluter 4 is fed into the hose 41 by the air pump and introduced into the second chamber 22 via the flow rate detector 52. The diluter 4 is not limited to an air pump, and a fan or the like may also be used. The flow rate detector 52 detects the flow rate (volume per unit time) of the diluent gas (air) introduced from the diluter 4 into the first chamber 21 or second chamber 22 in which the electrode plate 23 or 24 to be the cathode is provided (the second chamber 22 in the embodiment illustrated in FIG. 1).

The diluent gas (air), which is introduced from the diluent gas inlet 203 into the second chamber 22 by the diluter 4, flows down from the upper part to the lower part of the second chamber 22 and is exhausted from the mixed gas outlet 204 while being mixed with hydrogen gas generated in the vicinity of the surface of the cathode plate 24. In the present embodiment, the diluent gas inlet 203 is provided at the upper part of the second chamber 22, and the mixed gas outlet 204 is provided at the lower part of the second chamber 22. Therefore, the diluent gas can be delivered over the entire surface of the cathode plate 24, and the generated hydrogen gas can thus be exhausted together with the diluent gas from the mixed gas outlet 204 without staying in the second chamber 22. In an alternative embodiment, the diluent gas inlet 203 may be provided at the lower part of the second chamber 22, and the mixed gas outlet 204 may be provided at the upper part of the second chamber 22. However, because a small amount of water droplets may leak into the second chamber 22 from between the cathode plate 24 and the membrane 25, the mixed gas outlet 204 may preferably be provided at the lower part of the second chamber 22 so that the water droplets can be introduced into a gas/liquid separator 7 via a hose 71 together with the mixed gas. The gas/liquid separator 7 has a pot-like housing, and the mixed gas of hydrogen and air is delivered from the upper lid part to a mask or cannula 73 via a hose 72 while the water droplets caused in the second chamber 22 are stored in the bottom part of the gas/liquid separator 7.

The calculator 5 calculates the concentration c of the diluted hydrogen gas on the basis of an electric quantity It detected by the electric quantity detector 51 and a flow volume Q per time t detected by the flow rate detector 52. In addition, the calculator 5 displays the concentration c of hydrogen gas obtained by the calculation on the indicator 54 such as a seven-segment digital display. The indicator 54 illustrated in FIG. 1 is a display which allows visual recognition, but may also be a device, such as a speaker, which allows audible recognition of the concentration c. As shown in FIG. 1, the second chamber 22 may be provided with a temperature detector 53 that comprises a temperature sensor to detect a temperature T of the mixed gas. In this case, the concentration c of the diluted hydrogen gas may be calculated from three detection factors, i.e. the temperature T of the mixed gas detected by the temperature detector 53 as well as the electric quantity It detected by the electric quantity detector 51 and the flow volume Q per time t detected by the flow rate detector 52.

In an embodiment, when the calculated concentration c of hydrogen gas exceeds a deflagration lower limit value or a detonation lower limit value, the calculator 5 may present the fact using the indicator 54 or prohibit applying the DC voltage from the electric power source 3 to the pair of electrode plates 23 and 24.

The ground for calculation of the concentration c (vol %) of the mixed gas of hydrogen and air will then be described. The concentration c of the mixed gas may be calculated by the calculator 5. In the hydrogen gas generator 1 of FIG. 1, an electrochemical reaction as represented by Formula (1) below occurs on the surface of the cathode plate 24, and an electrochemical reaction as represented by Formula (2) below occurs on the surface of the anode plate 23.

$$2H_2O + 2e^- \rightarrow H_2 + 2OH^- \quad (1)$$

$$2OH^- \rightarrow H_2O + O_2/2 + 2e^- \quad (2)$$

According to the Faraday's second law of electrolysis, the electric quantity required for a substance of the equivalent amount per 1 gram to be deposited is constant regardless of the type of the substance. More specifically, when the amount of substance is n (mol), the mass is m (g), the molecular weight is M (g/mol), the current is I (A), the time of current flow is t (sec), the valency number of ions is z, and the Faraday constant is F (=9.65×10⁴ (C/mol)), Equations (3) below are established.

$$n = m/M = It/zF \quad (3)$$

That is, the electric quantity It required for 1 mol of hydrogen (the amount of substance n=1 mol) to be generated is 9.65×10⁴ C because It=nzF and z=1 (z is the valency number of ions of hydrogen) are met.

As expressed in the above Formula (1), 2 mol of electrons e⁻ allow 1 mol of hydrogen gas H₂ to be generated at the surface of the cathode plate 24. The volume occupied by 1 mol of hydrogen gas is 22.4 liters under the standard state of a temperature of 0° C. and a pressure of 1 atom because the Avogadro's law states that equal volumes of all gases, at the same temperature and pressure, have the same number of molecules.

Therefore, according to the above Faraday's second law of electrolysis, an electric quantity of 2×9.65×10⁴ C is required for 1 mol of hydrogen gas (22.4 liters) to be generated. In other words, an electric quantity of 1 coulomb allows generation of 1.16×10⁻⁴ liters (=22.4 liters/(2×9.65×10⁴ C)) of hydrogen gas (0° C.).

Here, the equation of state of a gas is written as PV=nRT, where P is the pressure of the gas (atm), V is the volume occupied by the gas (liters), n is the amount of substance of the gas (mol), R is the gas constant (=0.082), and T is the absolute temperature of the gas (K). Accordingly, in the state of 0° C., the change in temperature of 1 deg increases or decreases the volume by 1/273 liters.

From the above, when the electric quantity given to the cathode plate 24 is It (C), the volume of the generated hydrogen gas is V (liters), and the temperature of hydrogen gas is Δt (deg, difference from 0° C.), V=It×1.16×10⁻⁴×(1+Δt/273) can be obtained. Since the hydrogen gas generated at the surface of the cathode plate 24 and having a volume V (liters/sec) is diluted with the diluent gas having a volume of V1 (liters/sec), the concentration c (vol %) of the diluted hydrogen gas is obtained as (V/V1)×100. Therefore, when the electric quantity It (C) given to the cathode plate 24, the flow volume per unit time (liters/sec) of the diluent gas, and the temperature Δt (deg) of the diluted hydrogen gas (temperature difference from 0° C., which may be zero or take a positive or negative value) are detected, the concentration c of the diluted hydrogen gas can be obtained by calculation. Incidentally, when the electric quantity It given to the cathode plate 24 is a fixed value, the concentration c (vol %) of the diluted hydrogen gas may be calculated on the basis of only the flow volume per unit time (liters/sec) of the diluent gas detected by the flow meter 52 without providing the ammeter 51 for detecting the electric quantity It. Conversely, when the flow volume per unit time (liters/sec) of the diluent gas supplied from the diluter 4 is a fixed value, the concentration c (vol %) of the diluted hydrogen gas may be calculated on the basis of only the electric quantity It detected by the ammeter 51 without providing the flow meter 52 for detecting the flow volume per unit time (liters/sec) of the diluent gas. In these two cases, the concentration c (vol %) of the diluted hydrogen gas may be amended by the detected temperature Δt of the diluted hydrogen gas (temperature difference from 0° C., which may be zero or take a positive or negative value). Furthermore, when both the electric quantity It given to the cathode plate 24 and the flow volume per unit time (liters/sec) of the diluent gas supplied from the diluter 4 are fixed values, the concentration c (vol %) of the diluted hydrogen gas calculated by using above calculation formula may be presented on the display 54 as a pre-calculated fixed value without calculating by the calculator.

As will be understood, the temperature T of the diluted hydrogen gas may affect the calculated concentration c only with $1/273$ liters per 1 deg of temperature (error of about ±0.4%). Therefore, if the error is negligible to the desired accuracy of concentration c, i.e. negligible to the concentration c to be presented by the indicator 54, the temperature T may be estimated as a fixed value of a standard temperature within a range of about 15° C. to 25° C., for example, and the concentration c of the diluted hydrogen gas may be calculated only from the electric quantity It (C) and the flow volume Q per time t (liters/sec). When at least one of the electric quantity It given to the cathode plate 24 and the flow volume per unit time (liters/sec) of the diluent gas supplied from the diluter 4 is fixed value, it may determine whether non-fixed one of the electric quantity It and the flow volume per unit time (liters/sec) is within a predetermined trouble range or not by using the calculator 5. When the non-fixed one of the electric quantity It and the flow volume per unit time (liters/sec) is within the predetermined trouble range, at least one command signal of not performing calculation by the calculator 5, not presenting the concentration on the display 54, presenting a trouble indication using the display 54, and braking a power supply by the electric power source 3 may be output.

Figure 2:
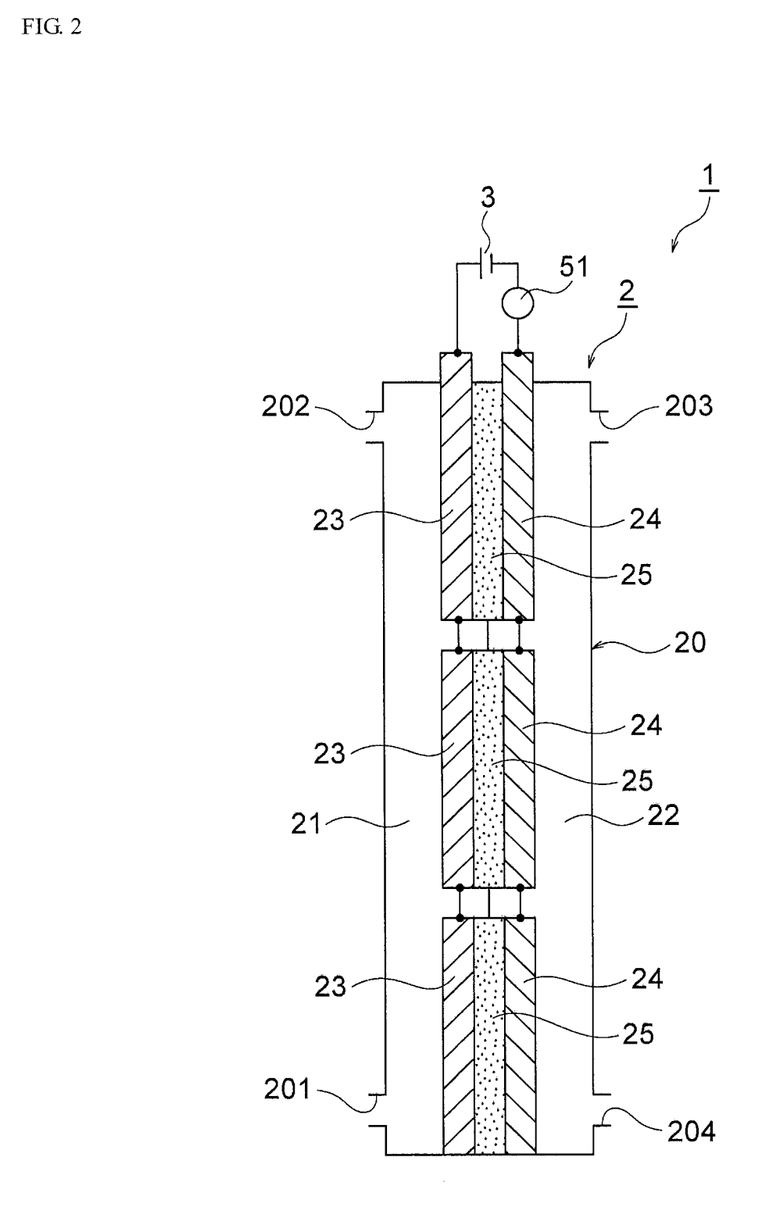
FIG. 2 is a schematic view illustrating the partial structure of a hydrogen gas generator according to another embodiment of the present invention.

FIG. 2 is a schematic view illustrating the partial structure of a hydrogen gas generator according to another embodiment of the present invention. The electrolyzer 2 of the present embodiment includes three pairs of electrode plates 23 and 24 and membranes 25. The three anode plates 23 are connected in series and provided in the first chamber 21, and the three cathode plates 24 are connected in series and provided in the second chamber 22. The electrolyzer 2 is partitioned into the first chamber 21 and the second chamber 22 by the housing 20. Other features are the same as those of the above-described embodiment illustrated in FIG. 1, and the description of the features will be borrowed and omitted herein. Also in the hydrogen gas generator 1 having such a structure, the calculator 5 can calculate the concentration c of the diluted hydrogen gas using the same scheme as that in the above embodiment illustrated in FIG. 1.

Figure 3:
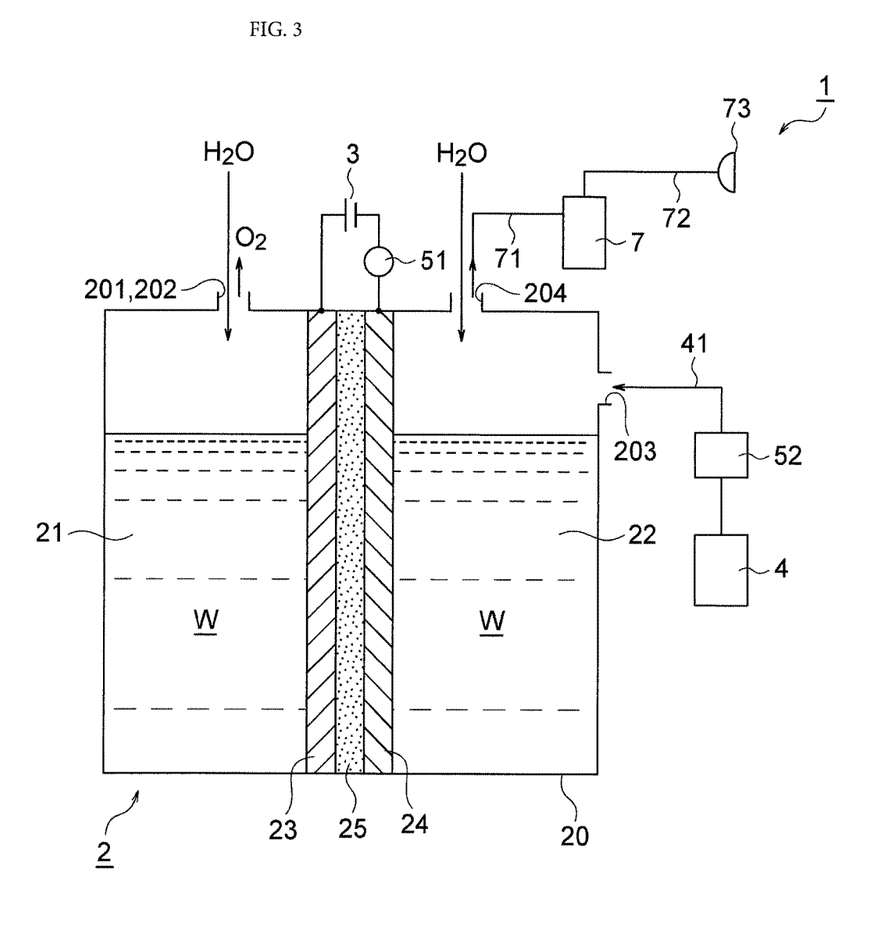
FIG. 3 is a schematic view illustrating the partial structure of a hydrogen gas generator according to yet another embodiment of the present invention.

FIG. 3 is a schematic view illustrating the partial structure of a hydrogen gas generator according to yet another embodiment of the present invention. The electrolyzer 2 of the present embodiment has substantially the same structure as that illustrated in FIG. 1 except that the water to be electrolyzed W is introduced not only into the first chamber 21 but also into the second chamber 22. Accordingly, the mixed gas outlet 204 for the second chamber 22 is provided at the ceiling surface of the second chamber 22. The water to be electrolyzed W is introduced into the second chamber 22 to have a certain amount rather than filling whole of the second chamber 22. This allows a space to be formed in the upper part of the second chamber 22 such that the hydrogen gas generated from the surface of the cathode plate 24 is appropriately mixed with the diluent gas supplied from the diluent gas inlet 203.

Other features are the same as those of the above-described embodiment illustrated in FIG. 1, and the description of the features will be borrowed and omitted herein. Also in the hydrogen gas generator 1 having such a structure, the calculator 5 can calculate the concentration c of the diluted hydrogen gas using the same scheme as that in the above embodiment illustrated in FIG. 1.

Figure 4:
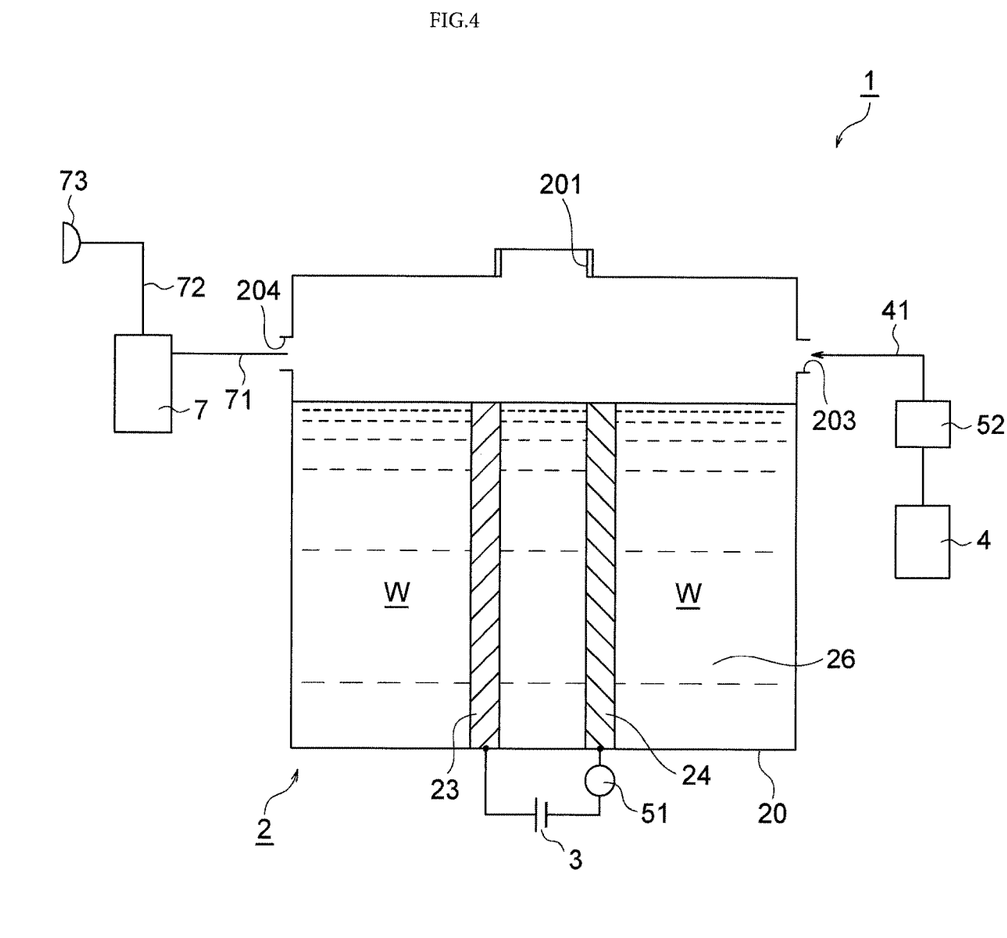
FIG. 4 is a schematic view illustrating the partial structure of a hydrogen gas generator according to still another embodiment of the present invention.

FIG. 4 is a schematic view illustrating the partial structure of a hydrogen gas generator according to still another embodiment of the present invention. Different from the above embodiments illustrated in FIG. 1 to FIG. 3, the electrolyzer 2 of the present embodiment is a so-called non-membrane electrolyzer that does not have a membrane 25. Accordingly, the housing 20 of the electrolyzer 2 includes only one electrolytic chamber 26 and is not partitioned into a first chamber 21 and a second chamber 22, which are considered to constitute an electrolytic chamber in the embodiments as illustrated in FIG. 1 to FIG. 3. In the electrolytic chamber 26, a pair of electrode plates 23 and 24 is arranged to have a predetermined distance. In the embodiment illustrated in FIG. 4, the electrode plate 23 is used as the anode plate, and the electrode plate 24 is used as the cathode plate. The water to be electrolyzed W introduced into the electrolytic chamber 26 from the inlet 201 for the water to be electrolyzed W is stored over the whole of the electrolytic chamber 26 because the inside of the electrolytic chamber 26 is not partitioned by the pair of electrode plates 23 and 24. However, similar to the embodiment illustrated in FIG. 3, the water to be electrolyzed W is introduced into the electrolytic chamber 26 to have a certain amount rather than filling whole of the electrolytic chamber 26. This allows a space to be formed in the upper part of the electrolytic chamber 26 such that the hydrogen gas generated from the surface of the cathode plate 24 is appropriately mixed with the diluent gas supplied from the diluent gas inlet 203.

In the present embodiment, different from the embodiments illustrated in FIG. 1 to FIG. 3, the hydrogen gas, which is generated from the surface of the cathode plate 24 and comes up into the space formed in the upper part of the electrolytic chamber 26, is diluted not only with the diluent gas supplied from the diluent gas inlet 203 but with oxygen gas which is generated from the surface of the anode plate 23 and comes up into that space. Therefore, the concentration c of hydrogen gas to be calculated by the above-described calculator 5 can be obtained as $\{V/(V1+V2)\} \times 100$ through dividing a volume V (liters/sec) of the hydrogen gas generated at the surface of the cathode plate 24 by the total sum of a volume V1 (liters/sec) of the diluent gas and a volume V2 (liters/sec) of the oxygen gas generated at the surface of the anode plate 23.

Figure 5:
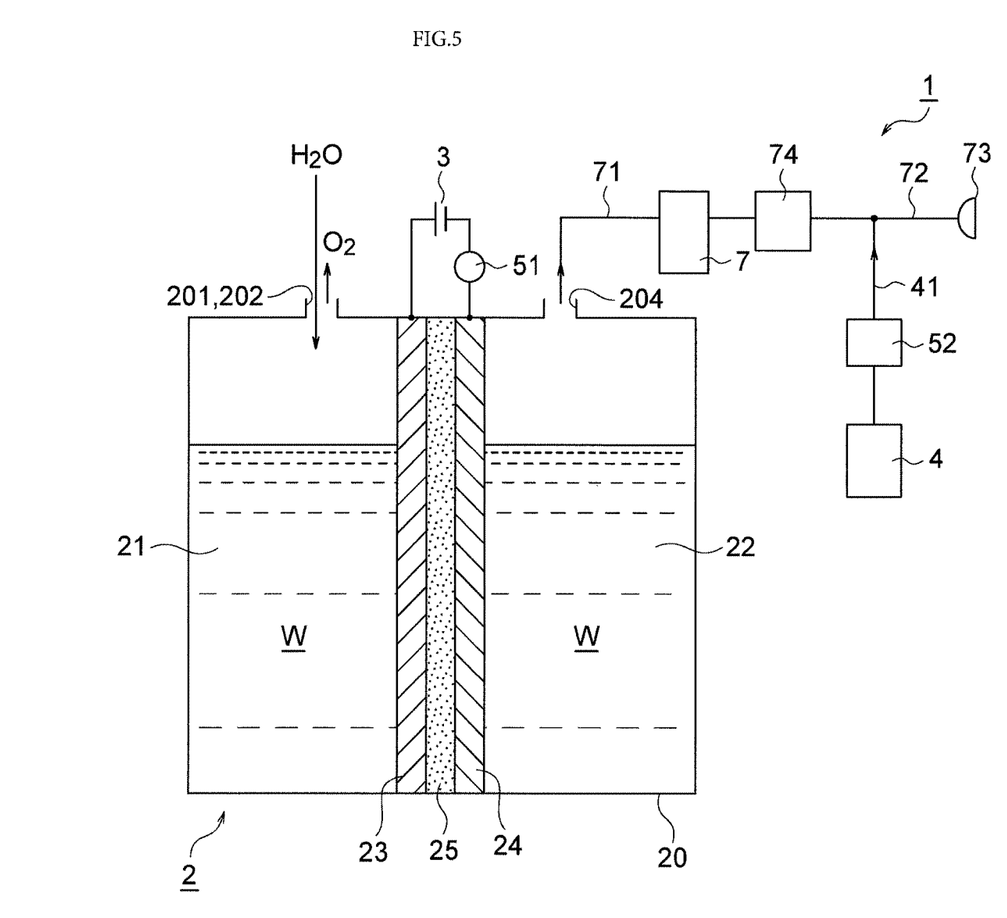
FIG. 5 is a schematic view illustrating the partial structure of a hydrogen gas generator according to a further embodiment of the present invention.

In the hydrogen gas generator according to the present invention, the position at which the hydrogen gas generated in the electrolyzer 2 is diluted is not limited to the inside of the electrolyzer 2. FIG. 5 is a schematic view illustrating the partial structure of a hydrogen gas generator according to a further embodiment of the present invention. The electrolyzer 2 of the present embodiment has the same structure as that illustrated in FIG. 3 except that the diluent gas from the diluter 4 is supplied into the hose 72 (which may be the hose 71) between the second chamber 22 and the mask or cannula 73 rather than into the second chamber 22. That is, the high-concentration hydrogen gas generated in the second chamber 22 reaches the gas/liquid separator 7 via the hose 71 by an air suction pump 74 and is introduced to the mask or cannula 73 via the hose 72, and the diluent gas such as air from the diluter 4 is mixed with the hydrogen gas in the middle of the hose 72. The air suction pump 74 may be omitted because the air pressure due to the diluter 4 acts in the hose 72.

Other features are substantially the same as those of the above-described embodiment illustrated in FIG. 3, and the description of the features will be borrowed and omitted herein. Also in the hydrogen gas generator 1 having such a structure, the calculator 5 can calculate the concentration c of the diluted hydrogen gas using the same scheme as that in the above embodiment illustrated in FIG. 1.

Figure 6:
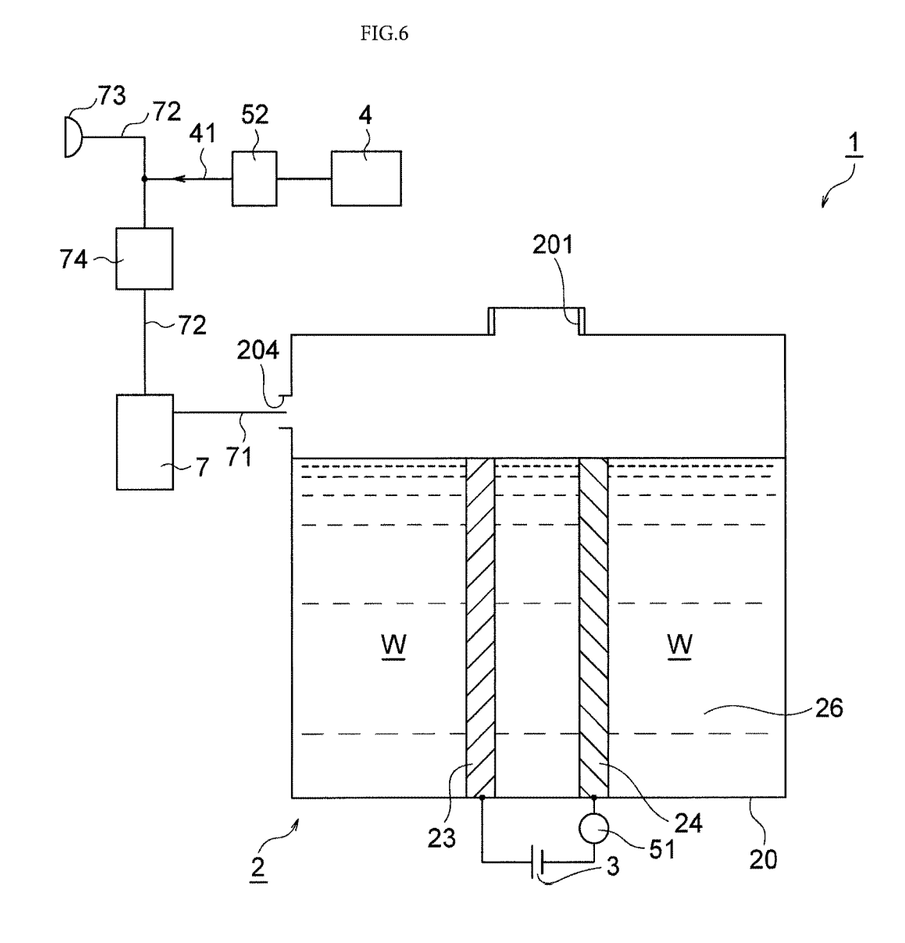
FIG. 6 is a schematic view illustrating the partial structure of a hydrogen gas generator according to a still further embodiment of the present invention.

Similar to the embodiment illustrated in FIG. 5, the hydrogen gas generators of the embodiments illustrated in FIG. 1 and FIG. 4 may be modified such that the diluent gas from the diluter 4 is supplied into the hose 71 or 72 between the second chamber 22 and the mask or cannula 73 rather than into the electrolyzer 2. FIG. 6 is a schematic view illustrating the partial structure of a hydrogen gas generator according to a still further embodiment of the present invention. The electrolyzer 2 of the present embodiment has the same structure as that illustrated in FIG. 4 except that the diluent gas from the diluter 4 is supplied into the hose 72 (which may be the hose 71) between the electrolytic chamber 26 and the mask or cannula 73 rather than into the electrolytic chamber 26. That is, the mixed gas of oxygen gas and hydrogen gas generated in the electrolytic chamber 26 reaches the gas/liquid separator 7 via the hose 71 by an air suction pump 74 and is introduced to the mask or cannula 73 via the hose 72, and the diluent gas such as air from the diluter 4 is mixed with the mixed gas in the middle of the hose 72. The air suction pump 74 may be omitted because the air pressure due to the diluter 4 acts in the hose 72.

Other features are substantially the same as those of the above-described embodiment illustrated in FIG. 4, and the description of the features will be borrowed and omitted herein. Also in the hydrogen gas generator 1 having such a structure, the calculator 5 can calculate the concentration c of the diluted hydrogen gas using the same scheme as that in the above embodiment illustrated in FIG. 1.

In the embodiments illustrated in FIG. 1 to FIG. 6, the calculator 5 calculates the concentration c of the diluted hydrogen gas at least from the electric quantity detected by the electric quantity detector 51 and the flow rate detected by the flow rate detector 52. In an alternative embodiment, however, the flow rate of the hydrogen gas generated from the surface of the cathode plate 24 may be measured as substitute for detection of the electric quantity by the electric quantity detector 51. That is, the calculator 5 may calculate the concentration c of the diluted hydrogen gas from the flow rate of a gas that contains hydrogen and the flow rate of the diluent gas for diluting the gas that contains hydrogen, and present the calculation result on the indicator 54.

Figure 7:
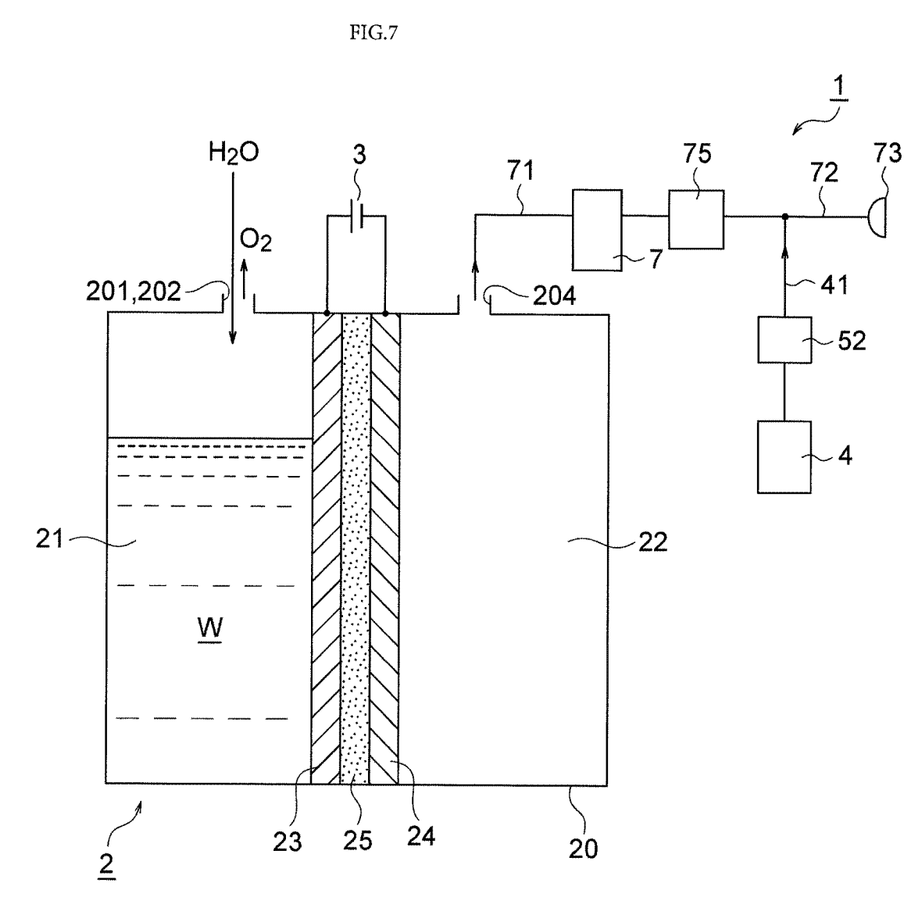
FIG. 7 is a schematic view illustrating the partial structure of a hydrogen gas generator according to another embodiment of the present invention.

FIG. 7 is a schematic view illustrating the partial structure of a hydrogen gas generator according to another embodiment of the present invention. The electrolyzer 2 of the present embodiment has the same structure as that illustrated in FIG. 5 except that the electric quantity detector 51 is not provided for the circuit of the electric power source 3 and a flow rate detector 75 is provided as substitute for the air suction pump 74. Other features are substantially the same as those of the above-described embodiment illustrated in FIG. 5, and the description of the features will be borrowed and omitted herein.

In the hydrogen gas generator 1 having such a structure, the hydrogen gas generated from the surface of the cathode plate 24 in the second chamber 22 is introduced via the hose 71 into the gas/liquid separator 7, in which the moisture contained in the hydrogen gas is removed. The hydrogen gas from which the moisture is removed is mixed with the diluent gas from the diluter 4 before being delivered to the mask or cannula 73 via the hose 72. Thus, the diluted hydrogen gas is delivered to the mask or cannula 73. During this operation, the flow rate detector 75 detects the flow rate of the hydrogen gas, and the flow rate detector 52 detects the flow rate of the diluent gas. Therefore, the calculator 5 can calculate the ratio of these flow rates thereby to obtain the concentration c of the diluted hydrogen gas. As will be understood, the flow rate detector 75 for detecting the flow rate of hydrogen gas and the flow rate detector 52 for detecting the flow rate of the diluent gas such as air may have to be each selected as an appropriate flow meter in accordance with the type of gas of which the flow rate is to be detected.

Figure 8:
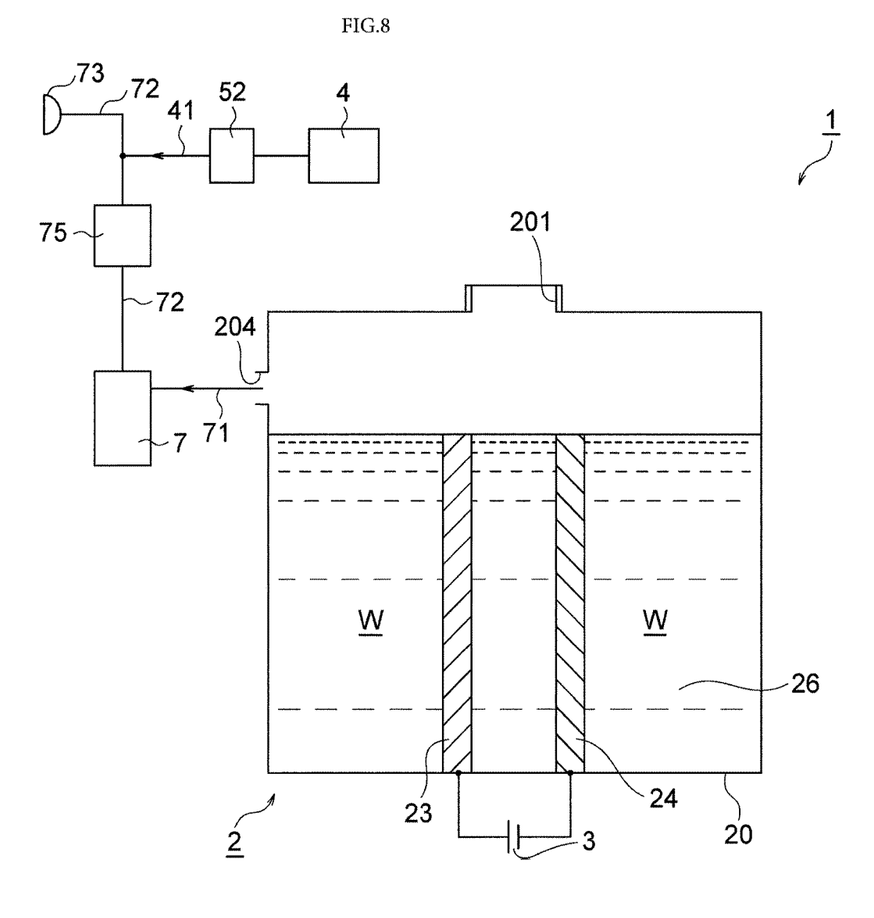
FIG. 8 is a schematic view illustrating the partial structure of a hydrogen gas generator according to still another embodiment of the present invention.

FIG. 8 is a schematic view illustrating the partial structure of a hydrogen gas generator according to still another embodiment of the present invention. The electrolyzer 2 of the present embodiment has the same structure as that illustrated in FIG. 6 except that the electric quantity detector 51 is not provided for the circuit of the electric power source 3 and a flow rate detector 75 is provided as substitute for the air suction pump 74. Other features are substantially the same as those of the above-described embodiment illustrated in FIG. 6, and the description of the features will be borrowed and omitted herein.

In the hydrogen gas generator 1 having such a structure, the hydrogen gas generated from the surface of the cathode plate 24 in the electrolytic chamber 26 and the oxygen gas generated from the surface of the anode plate 23 are introduced via the hose 71 into the gas/liquid separator 7, in which the moisture contained in the hydrogen gas and oxygen gas is removed. The hydrogen gas and oxygen gas from which the moisture is removed are mixed with the diluent gas from the diluter 4 before being delivered to the mask or cannula 73 via the hose 72. Thus, the diluted hydrogen gas and oxygen gas are delivered to the mask or cannula 73. During this operation, the flow rate detector 75 detects the flow rate of the gas that contains hydrogen gas, and the flow rate detector 52 detects the flow rate of the diluent gas. Therefore, the calculator 5 can calculate the ratio of these flow rates thereby to obtain the concentration c of the diluted hydrogen gas. In the present embodiment, the gas generated in electrolytic chamber 26 contains not only hydrogen but also oxygen. As apparent from the above-described Formula (1) and Formula (2), when 1 mol of hydrogen gas is generated, 0.5 mol of oxygen gas is generated. Therefore, when the flow rate detector 75 detects the total flow rate of hydrogen gas and oxygen gas, two thirds of the total flow rate represents the flow rate of hydrogen gas, and one thirds of the total flow rate represents the flow rate of oxygen gas.

EXAMPLES

Working examples of the present invention will be described below. Unless otherwise stated in the present application, the meters used to measure the physical property values include a hydrogen gas concentration meter "EVM-HY01-H available from FIS Inc." and an ammeter "CLAMP ON AC/DC HiTESTER 3265 (available from HIOKI E.E. CORPORATION)."

Working Examples

In an working example, the first chamber 21 of the hydrogen gas generator 1 as illustrated in FIG. 1 was filled with pure water, and the voltage applied to the pair of electrode plates was adjusted so that a current of 4 A would flow between the anode plate 23 and the cathode plate 24 for electrolysis, during which the generated hydrogen gas was diluted with air from the diluter 4. The supply rate of air from the diluter 4 was 1.5±0 0.1 liters/min. The ambient temperature was measured as 25° C. Other working examples were also conducted under the same condition except that the current flowing between the pair of electrode plates was changed to 5 A and 6 A and the supply rate of the diluent gas was changed to 2.0±0.1 liters/min and 2.5±0.1 liters/min. In each working example, the concentration c of the diluted hydrogen gas was obtained by calculation using the above-described calculation scheme based on the electric quantity flowing through the pair of electrode plates, the flow rate of the diluent gas, and the ambient temperature. Calculation results are listed in Table 1.

Comparative Examples

In each of the above working examples, the concentration c of the diluted hydrogen gas was actually measured using a hydrogen gas concentration meter (EVM-HY01-H available from FIS Inc.). Measurement results are also listed in Table 1.

TABLE 1

| Flow Rate (L/min) | Electrolytic Current (A) | Working Examples c (vol %) | Comparative Examples c (vol %) | Difference (vol %) |
|---|---|---|---|---|
| 1.5 | 4 | 2.11 | 2.15 | 0.04 |
| 1.5 | 5 | 2.53 | 2.62 | 0.09 |
| 1.5 | 6 | 3.04 | 3.05 | 0.01 |
| 2 | 4 | 1.59 | 1.56 | 0.03 |
| 2 | 5 | 1.90 | 1.94 | 0.04 |
| 2 | 6 | 2.28 | 2.25 | 0.03 |
| 2.5 | 4 | 1.27 | 1.36 | 0.09 |
| 2.5 | 5 | 1.52 | 1.70 | 0.18 |
| 2.5 | 6 | 1.82 | 2.04 | 0.22 |

The results of Table 1 show that only a small difference of 0.01 to 0.22 vol % was observed between the hydrogen gas concentration c obtained by calculation in each of the working examples and the hydrogen gas concentration c measured using the hydrogen gas concentration meter. In consideration that the detection error in a commercially available hydrogen gas concentration meter is about ±0.1 vol %, the accuracy in detecting the hydrogen gas concentration c according to the present embodiments is believed to be sufficient. Furthermore, in these examples and comparative examples, even when one of the flow rate and the electric quantity is the fixed value, the results of Table 1 show that only a small difference of 0.01 to 0.22 vol % was observed between the hydrogen gas concentration c obtained by calculation on the basis of the other detected value and the hydrogen gas concentration c measured using the hydrogen gas concentration meter.

DESCRIPTION OF REFERENCE NUMERALS

1 . . . Hydrogen gas generator
2 . . . Electrolyzer
  20 . . . Housing
    201 . . . Inlet for water to be electrolyzed
    202 . . . Gas outlet
    203 . . . Diluent gas inlet
    204 . . . Mixed gas outlet
  21 . . . First chamber
  22 . . . Second chamber
  23 . . . Anode plate (Electrode plate)
  24 . . . Cathode plate (Electrode plate)
  25 . . . Membrane
  26 . . . Electrolytic chamber
3 . . . Electric power source
  31 . . . Plug
  32 . . . AC/DC converter
4 . . . Diluter
  41 . . . Hose
  42 . . . Intake
5 . . . Calculator
  51 . . . Ammeter (Electric quantity detector)
  52 . . . Flow meter (Flow rate detector)
  53 . . . Temperature sensor (Temperature detector)
  54 . . . Display (Indicator)
  55 . . . Resistance detector
6 . . . Tank
  61 . . . Outlet for water to be electrolyzed
  62 . . . Hose
  63 . . . Gas inlet
  64 . . . Hose
  65 . . . Gas exhaust tower
7 . . . Gas/liquid separator
  71, 72 . . . Hose
  73 . . . Mask or cannula
  74 . . . Air suction pump
  75 . . . Flow meter (First flow rate detector)
W . . . Water to be electrolyzed

What is claimed is:

1. A hydrogen gas generator comprising:
an electrolyzer configured to include: a housing; an electrolytic chamber formed in the housing and into which water to be electrolyzed is introduced; at least a pair of electrode plates provided in the electrolytic chamber; and a gas outlet through which a gas containing hydrogen generated in the electrolytic chamber is output;
an electric power source configured to apply a DC voltage to the pair of electrode plates;
an electric quantity detector configured to detect an electric quantity given to the electrode plates and a flow rate detector configured to detect a flow rate of a diluent gas for diluting the gas containing hydrogen;
a calculator configured to calculate a concentration of hydrogen gas diluted with the diluent gas with time on a basis of the electric quantity detected by the electric quantity detector and the flow rate detected by the flow rate detector without using a hydrogen gas concentration sensor; and
an indicator configured to present the concentration of hydrogen gas calculated by the calculator in real time.

2. A hydrogen gas generator comprising:
an electrolyzer configured to include: a housing; an electrolytic chamber formed in the housing and into which water to be electrolyzed is introduced; at least a pair of electrode plates provided in the electrolytic chamber; and a diluent gas inlet through which a diluent gas for diluting hydrogen gas is introduced into the electrolytic chamber;
an electric power source configured to apply a DC voltage to the pair of electrode plates;
an electric quantity detector configured to detect an electric quantity given to the electrode plates and a flow rate detector configured to detect a flow rate of the diluent gas;
a calculator configured to calculate a concentration of the diluted hydrogen gas with time on a basis of the electric quantity detected by the electric quantity detector and the flow rate detected by the flow rate detector without using a hydrogen gas concentration sensor; and an indicator configured to present a concentration of hydrogen gas calculated by the calculator in real time.

3. A hydrogen gas generator comprising:
an electrolyzer configured to include: a housing; a first chamber formed in the housing and into which water to be electrolyzed is introduced; a second chamber provided separately from the first chamber in the housing; a membrane provided between the first chamber and the second chamber in the housing; and a pair of electrode plates one of which is provided in the first chamber and the other of which is provided in the second chamber; a tank configured to store the water to be electrolyzed;
an electric power source configured to apply a DC voltage to the pair of electrode plates;
at least one of a diluter configured to introduce a diluent gas into the first chamber or the second chamber in which the electrode plate to be a cathode is provided, the diluent gas diluting hydrogen gas generated and an electric quantity detector configured to detect an electric quantity given to the electrode plate to be the cathode;
a flow rate detector configured to detect a flow rate of the diluent gas from the diluter;
a calculator configured to calculate a concentration of the diluted hydrogen gas with time on a basis of the electric quantity detected by the electric quantity detector and the flow rate detected by the flow rate detector without using a hydrogen gas concentration sensor; and
an indicator configured to present the concentration of hydrogen gas calculated by the calculator in real time.

4. The hydrogen gas generator according to claim 1, further comprising
a temperature detector configured to detect a temperature of the diluted hydrogen gas,
wherein the calculator calculates the concentration of the diluted hydrogen gas on the basis of the electric quantity detected by the electric quantity detector, the flow rate detected by the flow rate detector, and the temperature detected by the temperature detector.

5. The hydrogen gas generator according to claim 2, further comprising
a temperature detector configured to detect a temperature of the diluted hydrogen gas,
wherein the calculator calculates the concentration of the diluted hydrogen gas on the basis of the electric quantity detected by the electric quantity detector, the flow rate detected by the flow rate detector, and the temperature detected by the temperature detector.

6. The hydrogen gas generator according to claim 3, further comprising
a temperature detector configured to detect a temperature of the diluted hydrogen gas,
wherein the calculator calculates the concentration of the diluted hydrogen gas on the basis of the electric quantity detected by the electric quantity detector, the flow rate detected by the flow rate detector, and the temperature detected by the temperature detector.

7. The hydrogen gas generator according to claim 3, further comprising
a resistance detector configured to detect an electric resistance value of the water to be electrolyzed stored in the tank,
wherein the calculator prohibits applying the DC voltage from the electric power source to the pair of electrode plates when the electric resistance value detected by the resistance detector is not within a predetermined range.

8. The hydrogen gas generator according to claim 3,
wherein the electrode plate provided in the first chamber is connected to a positive terminal of the electric power source and the electrode plate provided in the second chamber is connected to a negative terminal of the electric power source,
each of the pair of the electrode plates is provided to be in contact with the membrane,
the water to be electrolyzed is introduced only into the first chamber.

9. The hydrogen gas generator according to claim 8,
wherein the tank is located above the electrolyzer in the vertical direction,
the tank has a bottom surface provided with an outlet for the water to be electrolyzed, the first chamber has a lower part provided with an inlet for the water to be electrolyzed, and the outlet of the tank is connected to the inlet of the first chamber,
the first chamber has an upper part provided with a gas outlet and the gas outlet is connected to a gas inlet provided at the tank.

10. The hydrogen gas generator according to claim 8,
wherein the second chamber has a lower part provided with a mixed gas outlet through which the diluted hydrogen gas is output and the electrode plate to be the cathode is provided in the second chamber,
a gas/liquid separator is connected to the mixed gas outlet,
the diluted hydrogen gas is delivered to a target portion via the gas/liquid separator.

11. The hydrogen gas generator according to claim 1,
wherein, when the calculated concentration of hydrogen gas exceeds a deflagration lower limit value or a detonation lower limit value, the calculator presents it using the indicator or prohibits applying the DC voltage from the electric power source to the pair of electrode plates.

12. The hydrogen gas generator according to claim 2,
wherein, when the calculated concentration of hydrogen gas exceeds a deflagration lower limit value or a detonation lower limit value, the calculator presents it using the indicator or prohibits applying the DC voltage from the electric power source to the pair of electrode plates.

13. The hydrogen gas generator according to claim 3,
wherein, when the calculated concentration of hydrogen gas exceeds a deflagration lower limit value or a detonation lower limit value, the calculator presents it using the indicator or prohibits applying the DC voltage from the electric power source to the pair of electrode plates.

14. The hydrogen gas generator according to claim 1, further comprising
a controller configured to output at least one command signal of presenting a trouble indication using the indicator, not performing calculation by the calculator, not presenting the concentration on the indicator, and braking a power supply by the electric power source when at least one of the electric quantity detected and the flow rate detected is within a predetermined trouble range.

15. The hydrogen gas generator according to claim 2, further comprising
a controller configured to output at least one command signal of presenting a trouble indication using the indicator, not performing calculation by the calculator, not presenting the concentration on the indicator, and braking a power supply by the electric power source when at least one of the electric quantity detected and the flow rate detected is within a predetermined trouble range.

16. The hydrogen gas generator according to claim 3, further comprising
a controller configured to output at least one command signal of presenting a trouble indication using the indicator, not performing calculation by the calculator, not presenting the concentration on the indicator, and braking a power supply by the electric power source when at least one of the electric quantity detected and the flow rate detected is within a predetermined trouble range.

\* \* \* \* \*